US010108520B2

(12) United States Patent
Kattepur et al.

(10) Patent No.: US 10,108,520 B2
(45) Date of Patent: *Oct. 23, 2018

(54) SYSTEMS AND METHODS FOR SERVICE DEMAND BASED PERFORMANCE PREDICTION WITH VARYING WORKLOADS

(71) Applicant: Tata Consultancy Services Limited, Mumbai (IN)

(72) Inventors: Ajay Kattepur, Mumbai (IN); Manoj Karunakaran Nambiar, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 183 days.

This patent is subject to a terminal disclaimer.

(21) Appl. No.: 15/040,155

(22) Filed: Feb. 10, 2016

(65) Prior Publication Data
US 2017/0116034 A1   Apr. 27, 2017

(30) Foreign Application Priority Data

Oct. 27, 2015 (IN) .......................... 4053/MUM/2015

(51) Int. Cl.
   *G06F 9/46*    (2006.01)
   *G06F 11/34*   (2006.01)

(52) U.S. Cl.
   CPC ................................. *G06F 11/34* (2013.01)

(58) Field of Classification Search
   None
   See application file for complete search history.

(56) References Cited

U.S. PATENT DOCUMENTS

| 6,086,618 | A | 7/2000 | Al-Hilall et al. |
| 6,768,968 | B2 | 7/2004 | Ignatowski et al. |
| 7,024,589 | B2* | 4/2006 | Hartman ........ G01R 31/318307 714/32 |
| 7,099,816 | B2 | 8/2006 | Ignatowski et al. |
| 7,304,482 | B1* | 12/2007 | Kay ....................... G09G 3/006 324/615 |
| 7,337,431 | B1* | 2/2008 | Barnes ................ G06F 11/3664 714/E11.207 |
| 7,546,598 | B2* | 6/2009 | Blumenthal ........ G06F 11/3428 714/38.14 |

(Continued)

OTHER PUBLICATIONS

Kattepur, A. et al., "Performance Modeling of Multi-tiered Web Applications with Varying Service Demands", IPDPS 2015 Workshops, 10 pages, May 2015.

(Continued)

*Primary Examiner* — Hiren Patel
(74) *Attorney, Agent, or Firm* — Finnegan, Henderson, Farabow, Garrett & Dunner LLP

(57) ABSTRACT

Systems and methods for service demand based performance prediction with varying workloads are provided. Chebyshev nodes serve as optimum number of load testing points to minimize polynomial interpolation error rates. Chebyshev nodes are identified for a pre-determined range of concurrencies in the application under test. An array of interpolated service demands at the Chebyshev nodes, when integrated with a modified multi-server Mean Value Analysis (MVA) technique provides superior throughput and response time predictions.

14 Claims, 10 Drawing Sheets

(56) References Cited

U.S. PATENT DOCUMENTS

| | | | |
|---|---|---|---|
| 7,730,461 B2* | 6/2010 | Chamberlain | G06F 11/3684 717/125 |
| 8,265,916 B1* | 9/2012 | Portal | G06F 17/5009 703/13 |
| 8,332,507 B2 | 12/2012 | Wagh et al. | |
| 8,434,084 B2* | 4/2013 | Ferdous | G06F 9/5044 709/203 |
| 8,756,586 B2* | 6/2014 | Khanapurkar | G06F 11/3414 717/130 |
| 8,938,719 B2* | 1/2015 | Anjan | G06F 11/3672 717/126 |
| 9,317,330 B2* | 4/2016 | Duttagupta | G06F 9/5011 |
| 9,413,619 B2* | 8/2016 | Akolkar | H04L 41/147 |
| 9,501,387 B2* | 11/2016 | Cao | G06F 11/263 |
| 9,798,575 B2* | 10/2017 | Chen | G06F 9/46 |
| 9,823,991 B2* | 11/2017 | Liu | G06F 11/3696 |
| 2003/0233600 A1* | 12/2003 | Hartman | G01R 31/318307 714/32 |
| 2004/0243374 A1* | 12/2004 | Kundert | G01R 31/318357 703/14 |
| 2006/0248425 A1* | 11/2006 | Stimson | G01R 31/31707 714/741 |
| 2007/0043994 A1* | 2/2007 | Rosen | G01R 31/31711 714/742 |
| 2008/0104576 A1* | 5/2008 | Kaksonen | G06F 11/3672 717/124 |
| 2012/0030679 A1* | 2/2012 | Ferdous | G06F 9/5044 718/101 |
| 2012/0131554 A1* | 5/2012 | Mueller | G06F 11/3664 717/124 |
| 2012/0143588 A1* | 6/2012 | Liu | G06F 11/3696 703/22 |
| 2013/0042145 A1* | 2/2013 | Pasupuleti | G06F 11/3676 714/32 |
| 2013/0139130 A1* | 5/2013 | Anjan | G06F 11/3672 717/131 |
| 2014/0033179 A1* | 1/2014 | Gustus | G06F 11/3664 717/127 |
| 2014/0330536 A1* | 11/2014 | Chen | G06F 17/18 702/181 |
| 2015/0150020 A1* | 5/2015 | Duttagupta | G06F 11/3447 718/104 |
| 2016/0292318 A1* | 10/2016 | Zink | G06F 17/5009 |
| 2016/0314064 A1* | 10/2016 | Moretto | G06F 11/3688 |
| 2017/0153963 A1* | 6/2017 | Chahal | G06F 11/3485 |
| 2017/0235663 A1* | 8/2017 | Kattepur | G06F 11/3612 717/131 |
| 2017/0262362 A1* | 9/2017 | Duttagupta | G06F 11/3688 |

OTHER PUBLICATIONS

Casale et al., "QD-AMVA: Evaluating systems with queue-dependent service requirements", Elsevier Performance Evaluation, vol. 91, pp. 80-98, (2015).

Doyle, R. et al., "Model-Based Resource Provisioning in a Web Service Utility", USITS'03 Proceedings of the 4th conference on USENIX Symposium on Internet Technologies and Systems, vol. 4, 14 pages, (2003).

* cited by examiner

FIG.4A
FIG.4B
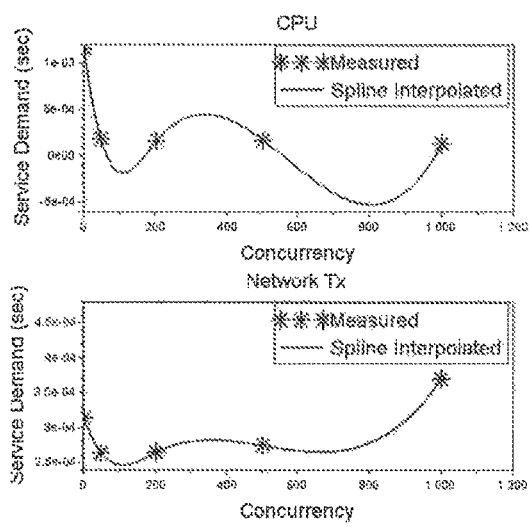
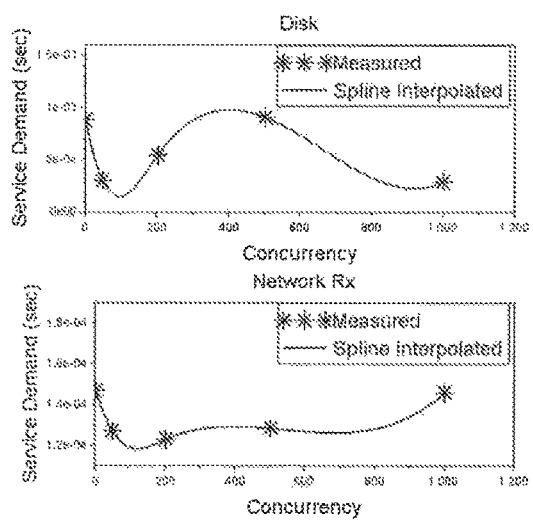
FIG.4C
FIG.4D

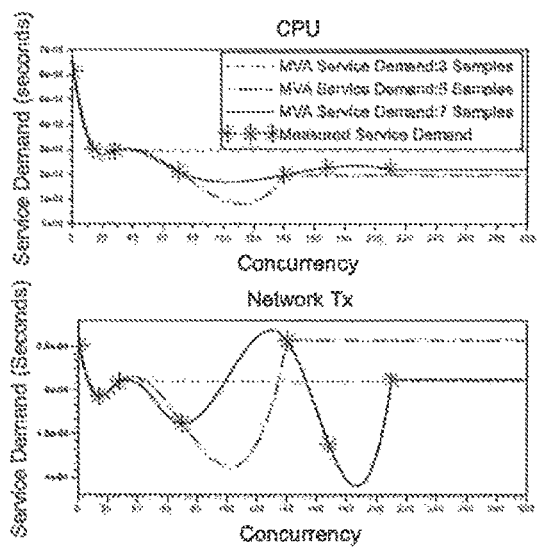
FIG.5A
FIG.5C
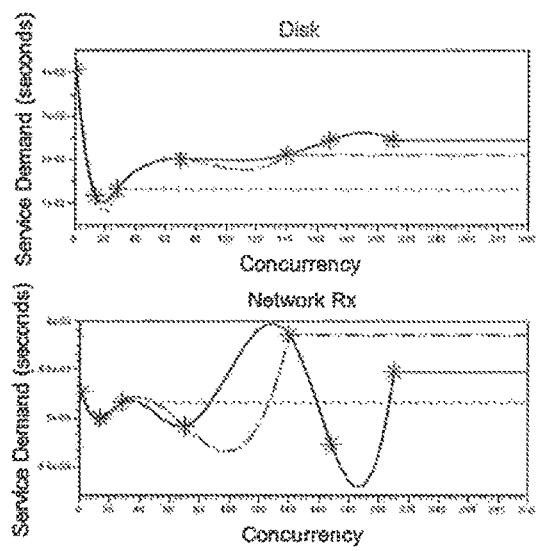
FIG.5B
FIG.5D

FIG.9A
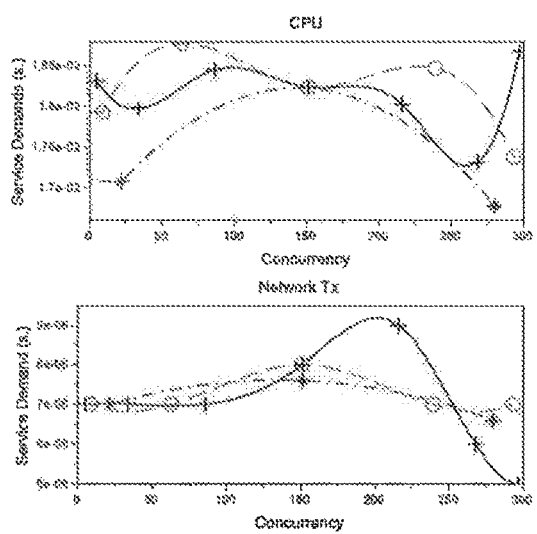
FIG.9C
FIG.9B
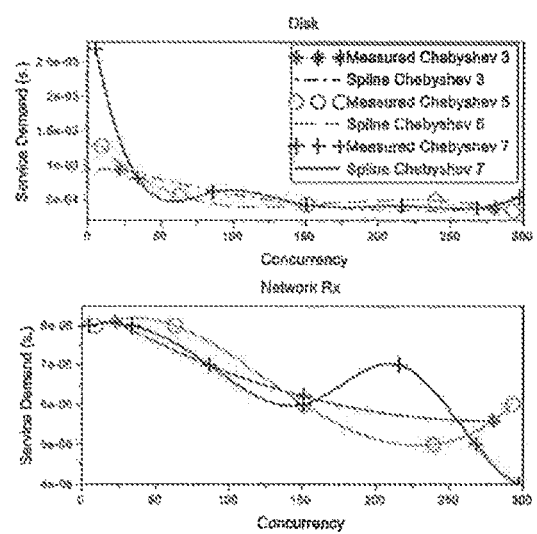
FIG.9D

SYSTEMS AND METHODS FOR SERVICE DEMAND BASED PERFORMANCE PREDICTION WITH VARYING WORKLOADS

PRIORITY CLAIM

This U.S. patent application claims priority under 35 U.S.C. § 119 to: India Application No. 4053/MUM/2015 filed on 27 Oct. 2015. The entire contents of the aforementioned application are incorporated herein by reference.

TECHNICAL FIELD

The disclosure herein generally relates to performance modeling of applications and more particularly to systems and methods that predict performance of multi-tiered web applications.

BACKGROUND

Performance testing of multi-tier applications is critical to estimate maximum concurrency, throughput and response time the associated resources would support before reaching 100% utilization. Accurate theoretical modeling of performance under varying load is a useful basis for comparison with measured load testing data. Prediction models require an accurate estimate of service demands as inputs. However, service demands vary with increasing workloads that are not captured in conventional performance predicting models. Varying service demands are pathological in nature for multi-tier systems where utilization of the network resources and hardware such as Central Processing Unit (CPU) and storage disk do not scale proportionally with higher concurrency. Conventional Mean Value Analysis (MVA) models are based on constant service demands or an average value of service demands captured for varying workloads and therefore are unable to capture variation in service demands which leads to inaccurate prediction of throughput and response times at higher workloads.

SUMMARY

Embodiments of the present disclosure present technological improvements as solutions to one or more of the above-mentioned technical problems recognized by the inventors in conventional systems.

Systems and methods of the present disclosure enable predicting performance of applications, particularly multi-tiered web applications wherein service demands or the time required by associated network resources and hardware such as Central Processing Unit (CPU) and storage disk vary with workload and need to be accurately modeled in order to predict performance at higher loads.

In an aspect, there is provided a computer implemented method for optimizing load testing points for performance prediction of an application under test with varying workloads, the method comprising identifying a range of concurrencies in the application under test; and computing Chebyshev nodes for interpolation within the identified range of concurrencies, each of the Chebyshev node corresponding to a load testing point for performance prediction.

In another aspect, there is provided a computer implemented method for service demand based performance prediction of an application under test with varying workloads, the method comprising: identifying a range of concurrencies in the application under test; computing an optimum number of load testing points for interpolation within the identified range of concurrencies; computing concurrency levels at the computed load testing points; generating service demand samples at the computed concurrency levels; generating an array of interpolated service demands for the identified range of concurrencies based on the computed optimum number of load testing points and the generated service demand samples; and computing throughput and response time for the identified range of concurrencies based on the generated array of interpolated service demands In an embodiment, the step of computing number of optimum load testing points comprises computing Chebyshev nodes, each of the computed Chebyshev nodes corresponding to a load testing point.

In an embodiment, the step of computing number of optimum load testing points is based on a pre-defined interpolation error.

In an embodiment, the step of generating service demand samples comprises performing load testing on hardware associated with the application under test.

In an embodiment, the step of generating service demand samples comprises computing utilization of hardware and network resources associated with the application under test.

In an embodiment, the step of generating an array of interpolated service demands is based on spline interpolation or linear interpolation.

In an embodiment, the step of computing throughput and response time comprises incorporating service demand values from the generated array of interpolated service demands into a queueing network or a simulation model.

In an embodiment, the queueing network is analyzed by recursively utilizing the array of interpolated service demands by Mean Value Analysis (MVA).

In another aspect, there is provided a system for service demand based performance prediction of an application under test with varying workloads, the system comprising: one or more processors; one or more internal data storage devices operatively coupled to the one or more processors and configured to store instructions configured for execution by the one or more processors to: identify a range of concurrencies in the application under test; compute an optimum number of load testing points within the identified range of concurrencies; compute concurrency levels at the computed load testing points; generate service demand samples at the computed concurrency levels; generate an array of interpolated service demands for the identified range of concurrencies based on the computed optimum number of load testing points and the generated service demand samples; and compute throughput and response time for the identified range of concurrencies based on the generated array of interpolated service demands.

In yet another aspect, there is provided a computer program product comprising a non-transitory computer readable medium having a computer readable program embodied therein, wherein the computer readable program when executed on a computing device, causes the computing device to: identify a range of concurrencies in the application under test; compute an optimum number of load testing points for interpolation within the identified range of concurrencies; compute concurrency levels at the computed load testing points; generate service demand samples at the computed concurrency levels; generate an array of interpolated service demands for the identified range of concurrencies based on the computed optimum number of load testing points and the generated service demand samples; and compute throughput and response time for the identified range of concurrencies based on the generated array of interpolated service demands.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles

FIG. 4A through 4D and FIG. 5A through 5D illustrate spline interpolated service demands computed as known in the art for different concurrency levels for CPU, storage disk, exemplary networks Tx (transmit) and Rx (receive) respectively for two different applications.

FIG. 5A through 5D illustrate spline interpolated service demands computed as known in the art for different concurrency levels for CPU, storage disk, exemplary networks Tx (transmit) and Rx (receive) respectively.

FIG. 9A through 9D illustrate spline interpolated service demands computed at various Chebyshev nodes for CPU, storage disk, exemplary networks Tx (transmit) AND Rx (receive) respectively in accordance with an embodiment of the present disclosure.

Figure 1:
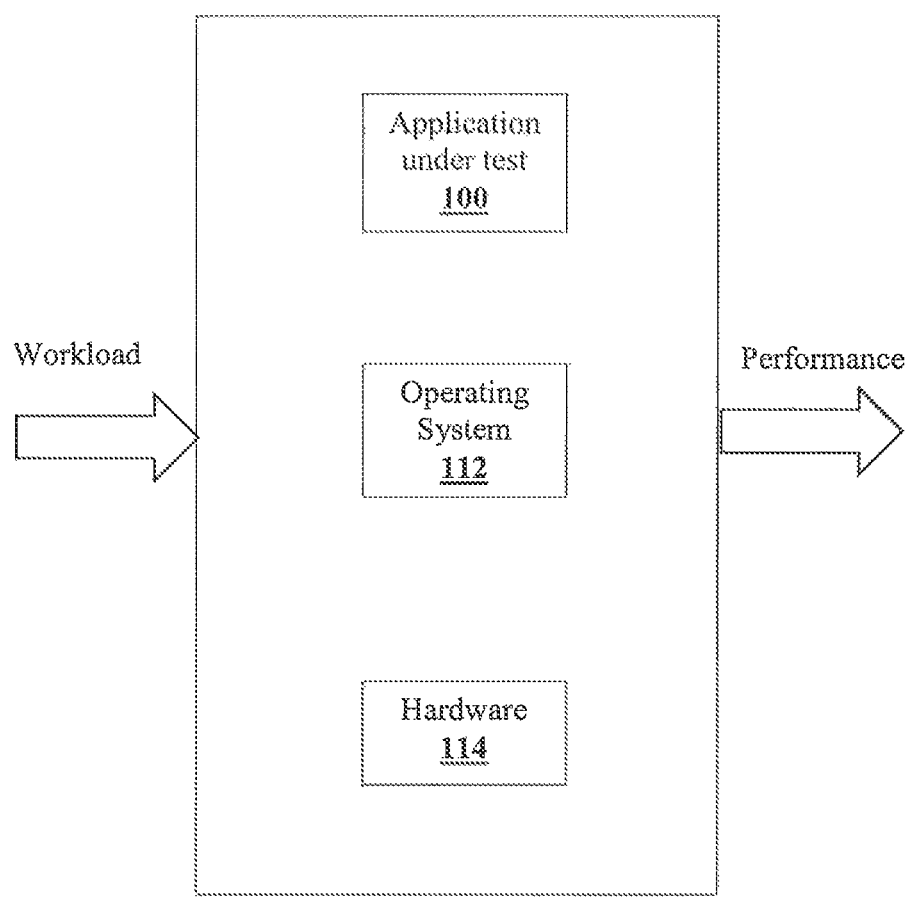
FIG. 1 illustrates a schematic representation of an application under test as known in the art.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Referring now to the drawings, and more particularly to FIGS. 1 through 6, where similar reference characters denote corresponding features consistently throughout the figures, there are shown preferred embodiments and these embodiments are described in the context of the following exemplary system and method.

Figure 2:
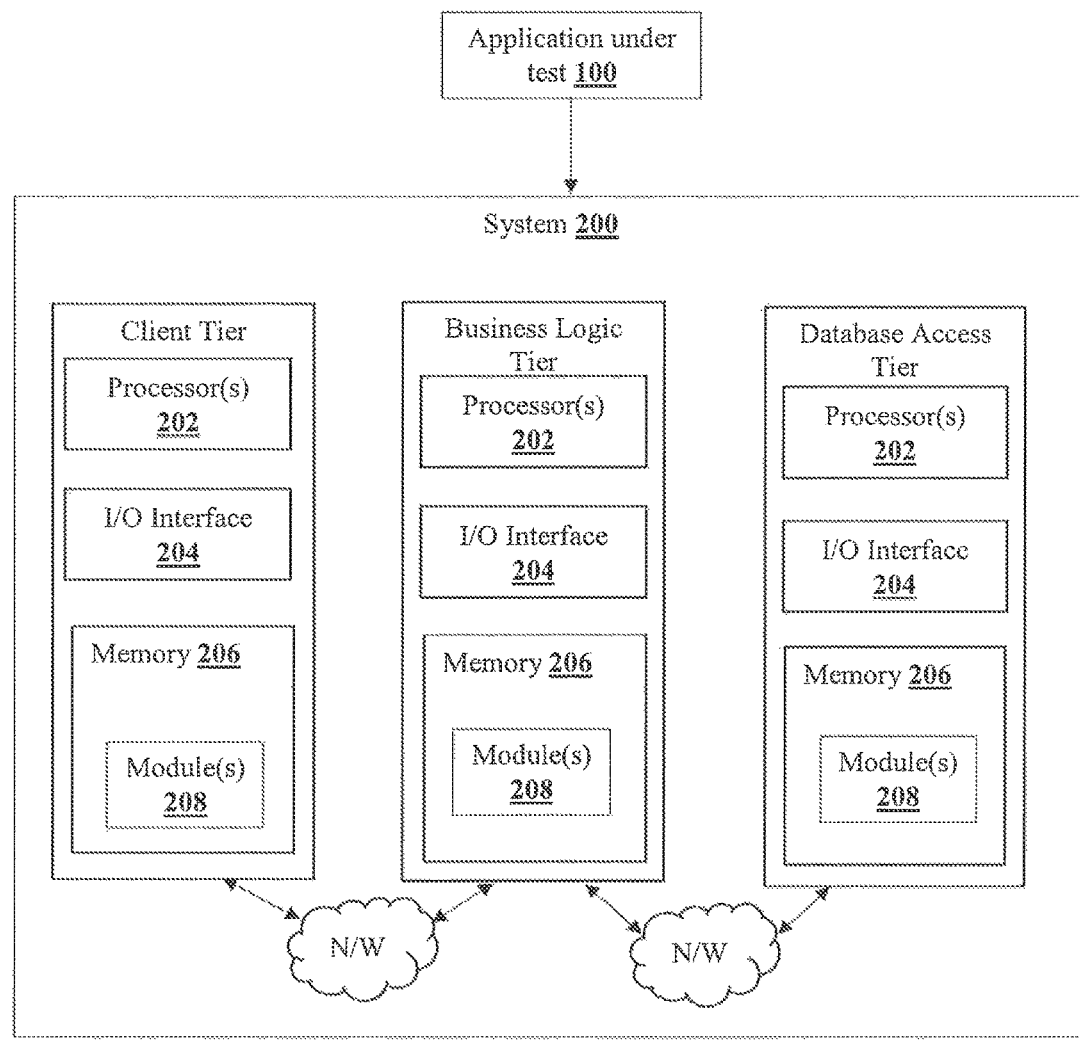
FIG. 2 illustrates an exemplary embodiment of a system for implementing a method for service demand based performance prediction of an application under test with varying workloads in accordance with an embodiment of the present disclosure.

FIG. 1 illustrates a schematic representation of an application under test 100, as known in the art hosted on an operating system 112 with associated hardware 114. FIG. 2 illustrates an exemplary embodiment of a system 200 for implementing a method for service demand based performance prediction of the application under test 100 with varying workloads in accordance with an embodiment of the present disclosure.

In an embodiment, system 200 includes one or more processors 202, communication interface or input/output (I/O) interface 204, and one or more internal data storage devices or memory 206 operatively coupled to the one or more processors 202 for each of Client Tier, Business Logic Tier and Database Access Tier. The one or more processors 202 can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, system 200 can be implemented on a server or in a variety of computing systems, such as a laptop computer, a desktop computer, a notebook, a workstation, a mainframe computer, a server, a network server, cloud, hand-held device and the like.

The I/O interface can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface can include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules 208 of system 200 can be stored in memory 206.

Web based applications deployed by most enterprises make use of multi-tiered architectures. Service demands or the time required by network resources and hardware such as Central Processing Unit (CPU) and storage disk to service one user request vary with workload and need to be accurately modeled in order to predict performance at higher loads.

Figure 3:
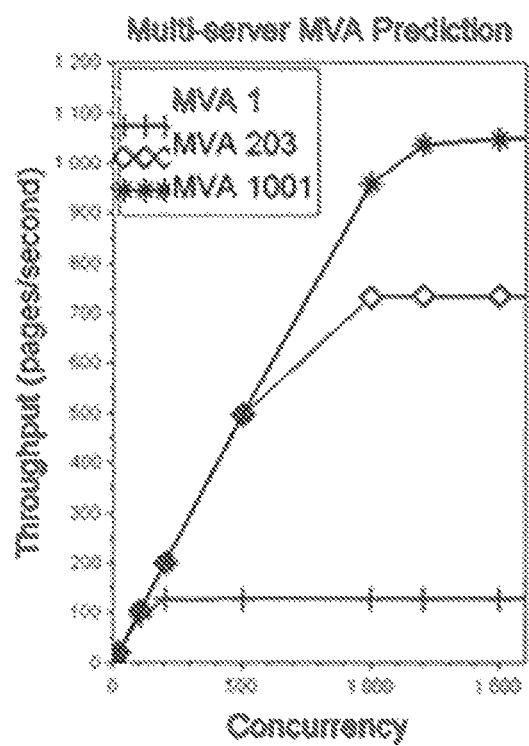
FIG. 3, illustrates throughputs predicted by conventional Mean Value Analysis (MVA) versus concurrency for service demands computed at three different concurrency levels.

FIG. 3 illustrates throughputs MVA 1, MVA 203 and MVA 1001 predicted by conventional Mean Value Analysis (MVA) versus concurrency for service demands computed at three different exemplary concurrency levels 1, 203 and 1001 respectively. The vastly differing throughputs are indicative of the variation of service demands that need to be captured for effectively predicting performance of an application with varying workloads.

FIG. 4A through 4D and FIG. 5A through 5D illustrate spline interpolated service demands for different concurrency levels for CPU, storage disk, exemplary networks Tx (transmit) and Rx (receive) respectively for two different applications. It may be noted that the generated polynomial splines overlap with the measured points and interpolated values that are not sampled. In general, the trend of the curves shows that service demand decreases with increase in workload. As seen from FIG. 5A through 5D, with just 3 samples (concurrency 1, 14, 28), the deviation in generated interpolation is more than for 5 samples (concurrency 1, 14, 28, 70, 140) and 7 samples (concurrency 1, 14, 28, 70, 140, 168, 210). Essentially, this demonstrates that higher the spread of captured service demands, better the interpolation and consequently closer the predicted outputs. As the service demand evolves with concurrency, finding a general representation of the interpolation with a few samples is a challenge. It is also seen that a general profiling of the underlying hardware does not help in estimating service demand variations. Application specific performance modeling through utilization of CPU, storage disk, network resources and throughput and varying concurrency, is necessary for accurate performance profiling.

Figure 6A:
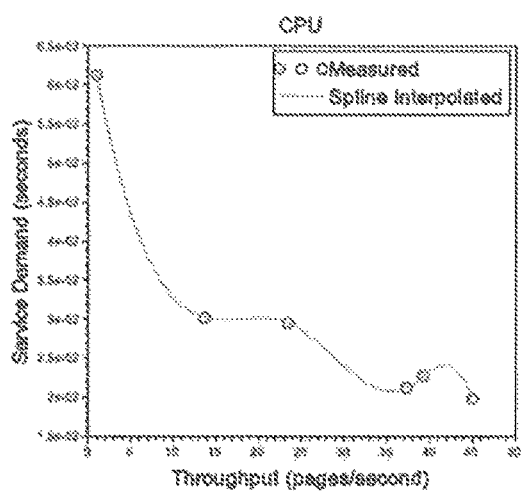
FIGS. 6A and 6B illustrate service demands computed as known in the art at different concurrency levels versus throughput for CPU and storage disk respectively.
Figure 6B:
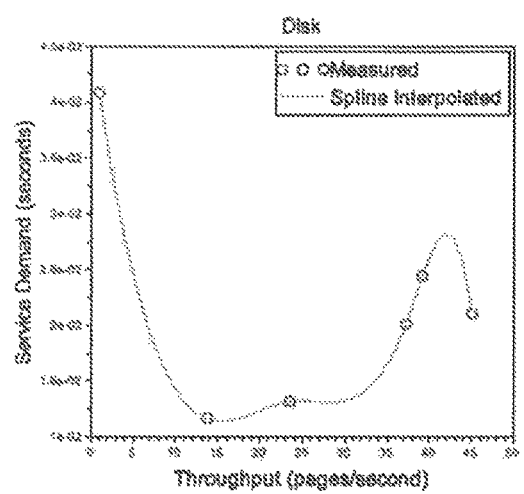

FIGS. 6A and 6B illustrate service demands computed as known in the art at different concurrency levels versus throughput for CPU and storage disk respectively, rather than against concurrency as illustrated in FIGS. 4A and 4B respectively. Typically, service demand has been modeled as a function of concurrency and think time. It was noted that the general trend of service demands was similar to that illustrated in FIGS. 4A and 4B respectively; however, the predicted outputs for throughput and response times showed higher deviation. Accurately quantifying the service demand as a function of concurrency, think time and throughput is a useful input for most prediction models.

Service demands of network resources and hardware such as CPU and storage disk are needed as inputs for performance prediction models. Such service demands vary with workload and need to be accurately captured. As performance prediction models cannot rely on load tests at higher workloads, judicious selection of points are needed which can then be interpolated. As seen in FIG. 5A through 5D, considerable deviation in the interpolated splines are observed. This is typically attributed to Runge's phenomenon, wherein oscillation occurs when using polynomial interpolation over a set of equi-spaced interpolation points. To avoid this phenomenon, the present disclosure provides a method that involves a set of optimum interpolating points. In accordance with the present disclosure, Chebyshev nodes serve as optimum number of load testing points to minimize polynomial interpolation error rates. In an embodiment, Chebyshev nodes are identified for a pre-determined range of concurrencies in the application under test. An array of Interpolated service demands at the Chebyshev nodes, when integrated with a modified multi-server MVA provides superior throughput and response time predictions.

Figure 7:
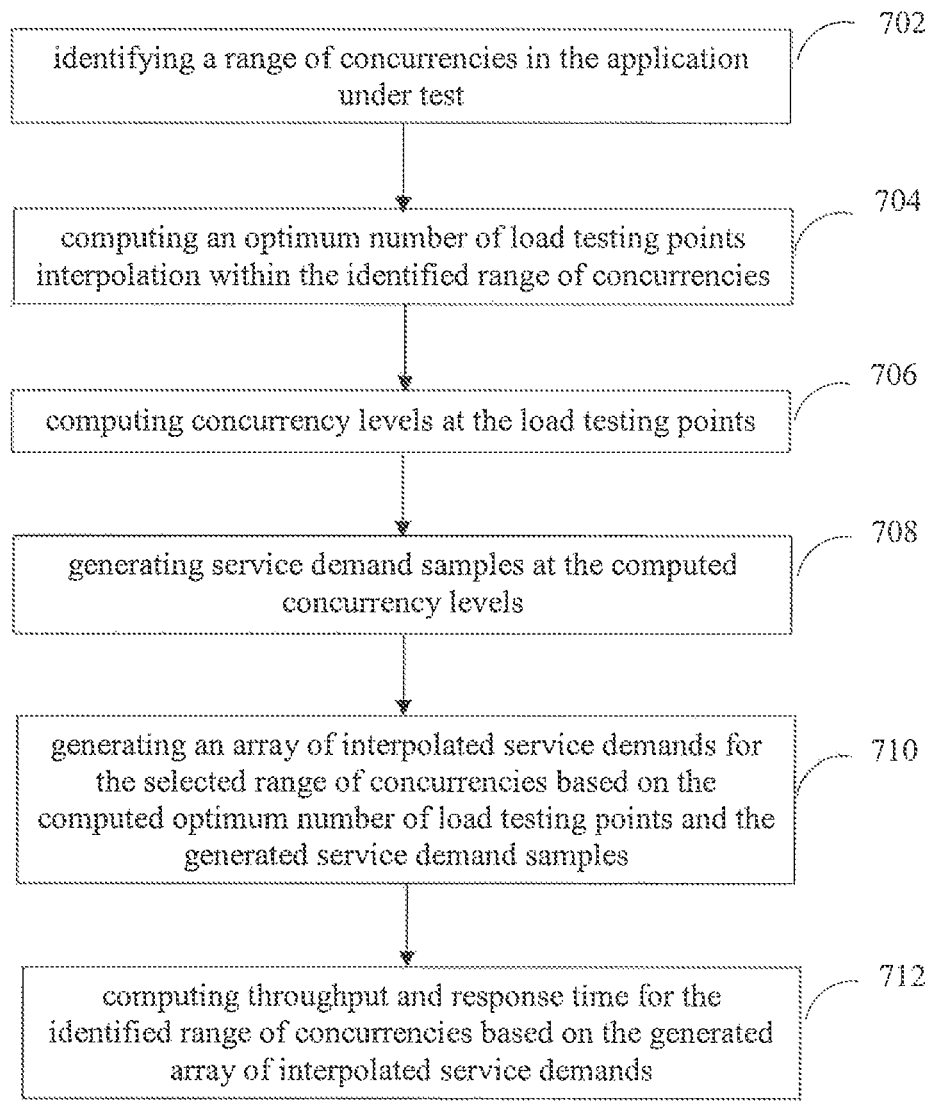
FIG. 7 is an exemplary flow diagram illustrating a computer implemented method for service demand based performance prediction of an application under test with varying workloads in accordance with an embodiment of the present disclosure.

FIG. 7 is an exemplary flow diagram illustrating a computer implemented method for service demand based performance prediction of an application under test with varying workloads in accordance with an embodiment of the present disclosure. At step 702, a range of concurrencies in the application under test are identified. At step 704, an optimum number of load testing points for interpolation within the identified range of concurrencies are computed. In an embodiment, the optimum load testing points are Chebyshev nodes based on a pre-defined interpolation error. For a given number of interpolating points n, the Chebyshev nodes x in an interval (−1, 1) are:

$$x_k = \cos\left(\frac{2k-1}{2n}\pi\right), k = 1, \ldots, n. \quad (1)$$

These are the roots of the Chebyshev polynomial of the first kind of degree n. For nodes over an arbitrary interval [a, b] representing range of concurrencies, a transformation can be used:

$$x_k = \frac{1}{2}(a+b) + \frac{1}{2}(b-a)\cos\left(\frac{2k-1}{2n}\pi\right), k = 1, \ldots, n. \quad (2)$$

The Chebyshev nodes in the method of the present disclosure provide a set of optimum number of nodes for polynomial spline interpolation. Given a function f in the interval [−1, +1] and n points x1, x2, ..., xn, in that interval, the interpolation polynomial is that unique polynomial P which has value f(xi) at each point xi. The interpolation error at x is:

$$f(x) - P(x) = \frac{f^{(n)}(x')}{n!} \prod_{i=1}^{n}(x - x_i) \quad (3)$$

for some $x' \in [-1, 1]$. It may then be shown that the interpolation error satisfies error bound:

$$|f(x) - P(x)| \le \frac{1}{2^{n-1}n!} \max_{x' \in [-1,1]} |f^{(n)}(x')| \quad (4)$$

Figure 8:
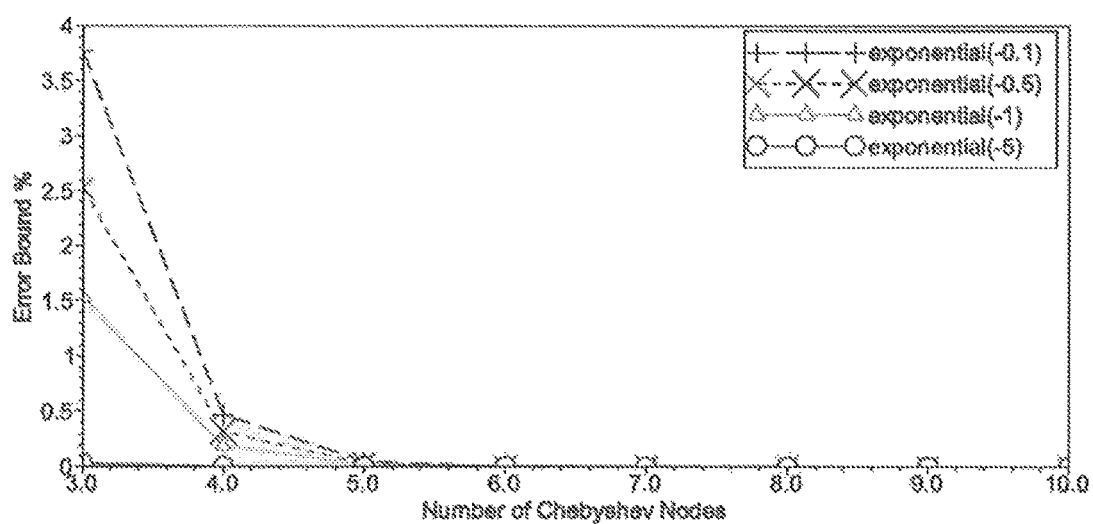
FIG. 8 illustrates error rates produced by varying Chebyshev nodes for exponential functions in accordance with an embodiment of the present disclosure.

The error bound produced for exponential functions with various mean values are compared and it is seen that for greater than 5 nodes, the error rate drops to less than 0.2% for all cases as illustrated in FIG. 8 wherein error rates produced by varying Chebyshev nodes for exponential functions in accordance with an embodiment of the present disclosure are illustrated.

Conventionally, performance testing involves selecting arbitrary points to generate load tests. These points are then interpolated to generate the performance measures. As described above, this results in Runge's phenomenon. In accordance with the present disclosure, load testing is performed at specific samples or load testing points identified in equation 2 herein above. At step 706 of the method of the present disclosure, concurrency levels are computed at each load testing point in the optimum number of load testing points from step 704. In an experimental setup for the application under test, using a=1 and b=300 in equation 2, three settings were used: Chebyshev 3 at concurrency N=22, 151, 280, Chebyshev 5 at N=9, 63, 151, 239, 293, Chebyshev 7 at N=5, 34, 86, 151, 216, 268, 297. At step 708, service demand samples are generated at the computed concurrency levels from step 706. In an embodiment, step of generating service demand samples comprises performing load testing. The step of generating service demand samples may also comprise computing utilization of hardware and network resources associated with the application under test by a method known in the art such as Linux performance counters. Referring to FIG. 9A through 9D that illustrate spline interpolated service demands computed at various Chebyshev nodes for CPU, storage disk, exemplary networks Tx (transmit) and Rx (receive) respectively in the experimental setup, it is observed that Runge's phenomenon of oscillation between points is not seen in any of the illustrated curves because of the judicious selection of load testing points in accordance with the present disclosure.

At step 710, an array of interpolated service demands is generated for the identified range of concurrencies from step 702 based on the computed optimum number of load testing points from step 704 and the generated service demand samples from step 708. In an embodiment, the step of generating an array of interpolated service demands can be based on spline interpolation or linear interpolation.

At step 712, throughput and response time for the identified range of concurrencies are computed based on the generated array of interpolated service demands from step 710. In an embodiment, the step of computing throughput and response time comprises incorporating service demand values from the generated array of interpolated service demands into a queueing network or a simulation model. In an embodiment, the queueing network is analyzed by recursively utilizing the array of interpolated service demands by Mean Value Analysis (MVA). The technique wherein the interpolated service demands are incorporated into MVA is hereinafter referred to as Mean Value Analysis with varying Service Demands (MVASD). In an embodiment, the technique MVASD can be represented as follows—

```
Input: Set of queuing stations k ∈ K each with number of severs C_k;
   Corresponding Service demands S_k, Visit counts V_k; Number of con-
   current users N; Think time Z; Interpolation function h;
Output: Throughput X^n with increasing concurrency n ∈ N; Response time
   R^n with increasing concurrency n ∈ N;
for k ← 1 to K do
|   Initialize queue at each station: Q_k ← 0
|   Initialize multi-server marginal probabilities:
|   p_k(1) ← 1
|   for j ← 2 to C_k do
|   |__ p_k(j) ← 0
|__
for n ← 1 to N do
|   for k ← 1 to K do
|   |   Multi-server queue correction factor: F_k ← Σ_{j=1}^{C_k} (C_{k-j})p_k(j)
|   |   Array of Abscissa at which service demands have been collected:
|   |   a_k ← {i_1, . . . , i_M}
|   |   Array of Service demands for each station:
|   |   b_k ← {S_k^{i1}, . . . , S_k^{iM}}
|   |   Interpolated Service demands generated with interval n:
|   |   SS_k^n ← h(a_k, b_k, n)
|   |__
|   |   Response time at each station: R_k ← (SS_k^n / C_k)(1 + Q_k + F_k)

|   Total response times using visit counts: R^n ← Σ_{k=1}^{K} V_k R_k

|   Throughput with Little's Law: X^n ← n / (R^n + Z)

|   for k ← 1 to K do
|   |   Update queues at each station: Q_k ← X^n V_k R_k
|   |   Update multi-server marginal probabilities:
```

$$p_k(1) \leftarrow 1 - \frac{1}{C_k}(X^n SS_k^n + \Sigma_{j=2}^{C_k} p_k(j))$$

for j ← 2 to $C_k$ do $$p_k(j) \leftarrow \frac{1}{j} X^n SS_k^n p_k(j-1)$$

return $X^n$, $R^n$

In spline interpolation, if (xi, yi) are modeled such that x1, x2, . . . , xn are a sequence of observations with the relation $y_i = h(xi)$, wherein $y_i$ represents spline interpolated array. The smoothing spline estimate $\hat{h}$ of the function h is defined to be the minimizer as indicated herein below:

$$\sum_{i=1}^{n} (y_i - \hat{h}(x_i))^2 + \lambda \int_{x_1}^{x_n} \hat{h}''(x)^2 dx,$$

wherein $\lambda \geq 0$ is a smoothing parameter, controlling the trade-off between fidelity of data and roughness of the function estimate. In an embodiment, a continuous and derivable piecewise function h(X) defined over [x1, xn] is generated. It consists of a set of cubic polynomials, each one $q_m(X)$ being defined on $[x_m, x_{m+1}]$ and connected in values and slopes to both its neighbors. Thus, over $[x_m, x_{m+1}]$, $h(X)=q_m(X)$ and $h(x_i)=y_i$. h(X) and subsequent derivatives h'(X), h''(X), h'''(X) are evaluated as given below.

$$yq_i = h(xq_i); \quad yq_i^1 = h'(xq_i);$$

$$yq_i^2 = h''(xq_i); \quad yq_i^3 = h'''(xq_i)$$

Further, in accordance with the present disclosure, outside the sampled $[x_1, x_n]$, an extrapolation model follows:

$$xq_i < x_1 \Rightarrow yq_i = y_1$$

$$xq_i > x_n \Rightarrow yq_i = y_n$$

Which limits the boundary interpolated values to output extrapolation. The function h captures the variance in service demand generated with increasing concurrency.

Figure 10A:
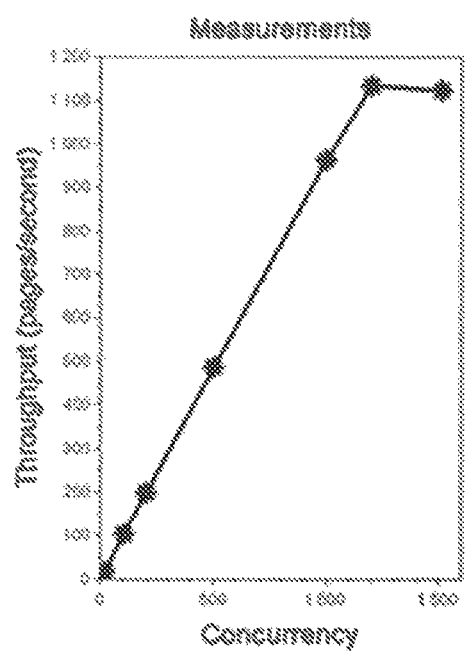
FIG. 10A illustrates throuput measured versus concurrency for service demands computed at different concurrency levels.
Figure 10B:
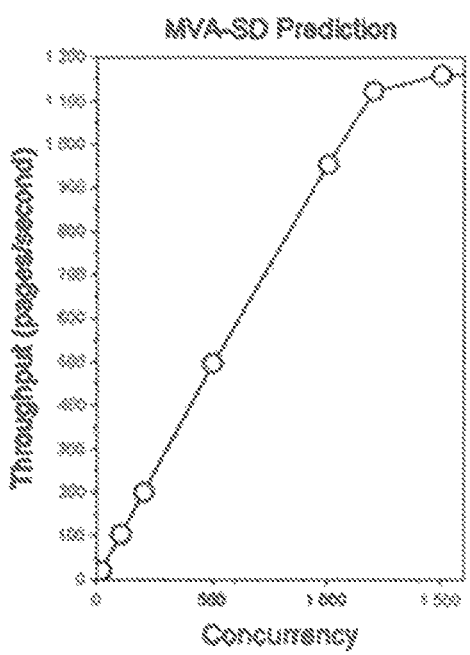
FIG. 10B illustrates throughput predicted by Mean Value Analysis based on service demands (MVASD) in accordance with an embodiment of the present disclosure versus concurrency.

FIG. 10A illustrates throughput measured versus concurrency for service demands computed at different concurrency levels and FIG. 10B illustrates throughput predicted by Mean Value Analysis based on service demands (MVASD) in accordance with an embodiment of the present disclosure versus concurrency. It can be noted that the predicted throughput is comparable with the measured throughput thereby validating the method of the instant disclosure wherein even with a few number of Chebyshev nodes, if the service demands are spline interpolated, the output MVASD is reliable. Accordingly, service demands can be computed at identified load testing points based on the accuracy level needed (equation 4) for suitable prediction.

Thus in accordance with the present disclosure, Chebyshev nodes and spline interpolated array of service demands are used to model variations in service demands. Minimizing the number of sample points (Chebshev Nodes) and subsequent error rate in interpolation were not considered in the conventional MVA. Systems and methods of the present disclosure facilitates selecting optimum number of sample points for interpolation prior to utilizing performance prediction techniques or queueing networks such as MVA.

The written description describes the subject matter herein to enable any person skilled in the art to make and use the embodiments of the invention. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the invention may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A computer implemented method for service demand based performance prediction of an application under test with varying workloads, the method comprising:
   identifying a predetermined range of concurrencies in the application under test;
   computing an optimum number of load testing points for interpolation within the identified range of concurrencies, the load testing points comprising Chebyshev nodes within the predetermined range;
   computing concurrency levels at the computed load testing points;
   generating service demand samples at the computed concurrency levels;
   generating an array of interpolated service demands for the identified range of concurrencies based on the computed optimum number of load testing points and the generated service demand samples;
   computing throughput and response time for the identified range of concurrencies based on the generated array of interpolated service demands; and
   generating and outputting a performance profile for the application for use in optimizing the application, the performance profile including the computed throughput and response time.

2. The computer implemented method of claim 1, wherein the step of computing number of optimum load testing points is based on a pre-defined interpolation error.

3. The computer implemented method of claim 1, wherein the step of generating service demand samples comprises performing load testing on hardware associated with the application under test.

4. The computer implemented method of claim 1, wherein the step of generating service demand samples comprises computing utilization of hardware and network resources associated with the application under test.

5. The computer implemented method of claim 1, wherein the step of generating an array of interpolated service demands is based on spline interpolation or linear interpolation.

6. The computer implemented method of claim 1, wherein the step of computing throughput and response time comprises incorporating service demand values from the generated array of interpolated service demands into a queueing network or a simulation model.

7. The computer implemented method of claim 6, wherein the queueing network is analyzed by recursively utilizing the array of interpolated service demands by Mean Value Analysis (MVA).

8. A system for service demand based performance prediction of an application under test with varying workloads, the system comprising:
   one or more processors;
   one or more internal data storage devices operatively coupled to the one or more processors and configured to store instructions configured for execution by the one or more processors to:
      identify a predetermined range of concurrencies in the application under test;
      compute an optimum number of load testing points within the identified range of concurrencies, the load testing points comprising Chebyshev nodes within the predetermined range;
      compute concurrency levels at the computed load testing points;
      generate service demand samples at the computed concurrency levels;
      generate an array of interpolated service demands for the identified range of concurrencies based on the computed optimum number of load testing points and the generated service demand samples;
      compute throughput and response time for the identified range of concurrencies based on the generated array of interpolated service demands; and
      generate and output a performance profile for the application for use in optimizing the application, the performance profile including the computed throughput and response time.

9. The system of claim 8, wherein to generate service demand samples, the instructions are further configured to perform load tests on hardware associated with the application under test.

10. The system of claim 8, wherein to generate service demand samples, the instructions are further configured to compute utilization of hardware and network associated with the application under test.

11. The system of claim 8, wherein to generate an array of interpolated service demands, the instructions are further configured to perform spline interpolation or linear interpolation.

12. The system of claim 8, wherein to compute throughput and response time, the instructions are further configured to incorporate service demand values from the generated array of interpolated service demands into a queueing network or a simulation model.

13. The system of claim 12, wherein the queueing network is analyzed by recursively utilizing the array of interpolated service demands by Mean Value Analysis (MVA).

14. A computer program product comprising a non-transitory computer readable medium having a computer readable program embodied therein, wherein the computer readable program, when executed on a computing device, causes the computing device to:
   identify a predetermined range of concurrencies in the application under test;
   compute an optimum number of load testing points within the identified range of concurrencies, the load testing points comprising Chebyshev nodes within the predetermined range;
   compute concurrency levels at the computed load testing points;
   generate service demand samples at the computed concurrency levels;
   generate an array of interpolated service demands for the identified range of concurrencies based on the computed optimum number of load testing points and the generated service demand samples;
   compute throughput and response time for the identified range of concurrencies based on the generated array of interpolated service demands; and
   generate and output a performance profile for the application for use in optimizing the application, the performance profile including the computed throughput and response time.

* * * * *